United States Patent
Ih

[11] 3,953,105
[45] Apr. 27, 1976

[54] HOLOGRAPHIC SCANNER UTILIZING AUXILIARY REFLECTIVE SURFACE

[75] Inventor: Charles Ih, Darien, Conn.
[73] Assignee: Epsco, Incorporated, Westwood, Mass.
[22] Filed: Oct. 16, 1974
[21] Appl. No.: 515,317

[52] U.S. Cl. .................................. 350/7; 350/3.5; 350/162 ZP
[51] Int. Cl.² ................... G02B 27/17; G03H 1/04
[58] Field of Search ............... 350/7, 6, 3.5, 162 ZP; 178/7.6

[56] References Cited
UNITED STATES PATENTS

| | | | |
|---|---|---|---|
| 3,614,193 | 10/1971 | Beiser | 350/7 |
| 3,619,033 | 11/1971 | McMahon | 350/3.5 |
| 3,707,723 | 12/1972 | Levene | 350/7 |
| 3,721,487 | 3/1973 | Pieuchard et al. | 350/7 |
| 3,795,768 | 3/1974 | Locke | 350/7 |

Primary Examiner—Ronald J. Stern
Assistant Examiner—Jon W. Henry
Attorney, Agent, or Firm—Weingarten, Maxham & Schurgin

[57] ABSTRACT

An apparatus which includes an optical spinner having a surface rotatable about an axis that is substantially perpendicular to the surface at its point of intersection with the axis. A source of coherent radiation is directed toward the surface and a zone-type lens covering at least a portion of the surface is configured to receive the radiation and direct it toward a first scanning focal point locus. An auxiliary reflective means is disposed in the path of the directed radiation, the reflective means being shaped to redirect the radiation toward a second scanning focal point locus, such that the principal ray of the radiation is substantially perpendicular to the axis. In this manner, the problems generally encountered with non-normal impinging light bundles are overcome.

4 Claims, 4 Drawing Figures

HOLOGRAPHIC SCANNER UTILIZING AUXILIARY REFLECTIVE SURFACE

BACKGROUND OF THE INVENTION

This invention relates to scanning apparatus and, more particularly, to an improved holographic spinner system.

There have been previously devised many forms of spinning optical scanners which are utilized for scanning a liquid beam in a repetitive fashion over a surface. A commonly used type employs a multifaceted mirror of pyramidal shape. This type of device has been successively utilized in various applications but has certain drawbacks. For example, the cost of fabricating pyramidal-shaped multifaceted spinners to achieve substantial identity in the reflecting properties of all facets is high, so where relatively high performance characteristics are necessary, one can expect correspondingly great costs. Also, such spinners are often employed at high speed and it is found that the facet surfaces can cause an aerodynamic "drag" which increases the required drive power and, perhaps more seriously, causes inertial deformation which manifests itself as a degradation of system performance.

As an alternative to multifaceted pyramidal mirrors, there has been recently developed a scanning device sometimes known as a "holographic spinner" which employs a plurality of zone-type lenses on a rotating surface, the lenses functioning to focus incident light at a locus of focal points which define a desired scan line. Holographic spinner elements have been fabricated in various shapes with, for example, U.S. Pat. No. 3,614,193 disclosing a spinner having a convex spherical surface, U.S. Pat. No. 3,721,487 disclosing a spinner having a concave spherical surface, and copending U.S. application Ser. No. 514,613 (entitled "LIGHT SCANNING SYSTEM AND METHOD OF MAKING SAME" and assigned to the same assignee as the present invention) disclosing a flat disc spinner surface. The optical symmetries associated with these configurations render them particularly useful in certain applications. For example, it is envisioned that replication techniques, such as the pressing techniques by which phonograph records are made, may ultimately be used to produce low cost holographic spinner elements for use in relatively low cost scanning systems (e.g. in facsimile transmission equipment). This type of replication is facilitated if the zone-type lens is used on a relatively flat spinner surface; e.g., a flat disc spinner or a large radius concave spinner. An operational problem exists, however, when employing a spinner having a flat or a concave spherical shape. Specifically, in these types of systems the principal (or central) ray emerging from the holographic spinner is not normal to the scanning surface or film, the inclination angle generally being greater than 30°. This is evident, for example, in the U.S. Pat. No. 3,721,487 and is necessitated by optical limitations in making the holographic surface on the spinner. (It is well understood by those skilled in the art that as this inclination angle is reduced the "interference" fringes of the holographic pattern move closer together, so very small inclination angles are presently considered unattainable.) As a consequence of the non-normal impinging beam, the reconstructed spot is generally elongated in a cross-scan direction. Also, the position of the reconstructed spot changes significantly with focusing. This position sensitivity of prior art scanners results in a degradation of the scanline pattern since a non-uniformity of the scanning surface is effectively translated to spot movement.

It is one object of the present invention to provide an optical scanning device of the type described, but wherein the principal ray of the light bundle impinging on the scanning surface is constrained to be normal to the scanning surface.

SUMMARY OF THE INVENTION

The present invention is directed to an optical scanning system which overcomes deficiencies of prior art systems as described. In accordance with the invention there is provided an optical spinner having a surface rotatable about an axis that is substantially perpendicular to the surface at its point of intersection with the axis. Means are provided for effecting rotation of the surface about the axis. Also, means are provided for directing a source of coherent radiation toward the surface. A zone-type lens covers at least a portion of the surface, the lens being configured to receive radiation and direct it toward a first scanning focal point locus. An auxiliary reflective means is disposed in the path of the directed radiation, the reflective means being shaped to redirect the radiation toward a second scanning focal point locus, such that the principal ray of the radiation is substantially perpendicular to the axis. In this manner, the problems generally encountered with non-normal impinging light bundles are overcome.

In the preferred embodiment of the invention the auxiliary reflective means is a spherical mirror having its center of curvature on the axis of rotation. A spherical mirror would be normally considered unsuitable for usage in an application of this type due to the image aberrations it introduces. However, in the present system the spherical mirror is also employed when recording the holographic zone-type lens surface, thereby introducing "preaberrations." During reconstruction, the preaberrations are canceled by the aberrations introduced by the spherical mirror, whereby the desired high resolution spot can be achieved.

Further features and advantages of the invention will become more readily apparent from the following detailed description when taken in conjunction with the accompanying drawings.

DESCRIPTION OF THE PREFERRED EMBODIMENTS

Figure 1:
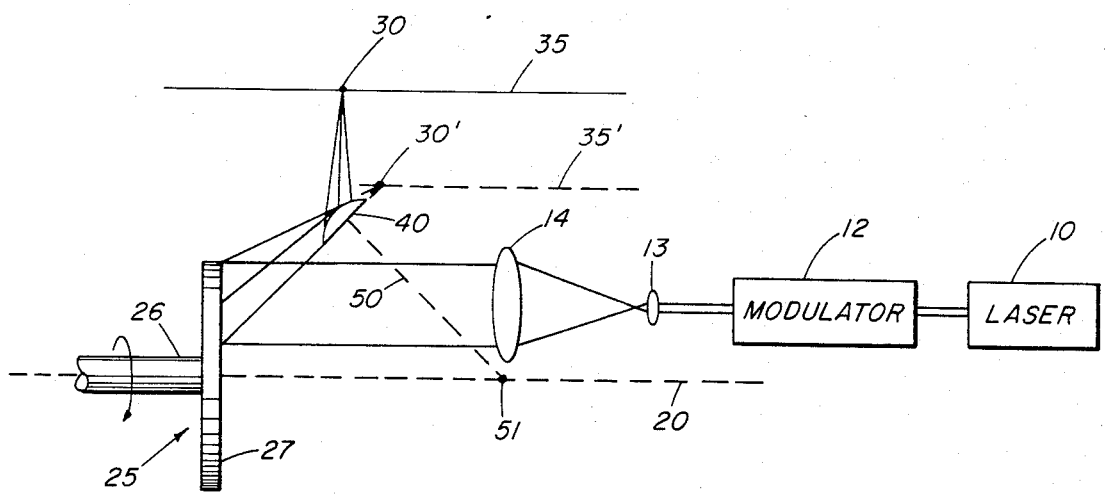
FIG. 1 illustrates an embodiment of the invention in simplified schematic form.

FIG. 1 illustrates, in simplified schematic form, the essential elements of a scanning apparatus, including the invention, that is useful, for example, in a relatively high resolution system for recording and/or reproducing intelligence on a record medium such as a film. The apparatus includes a source of light, preferably a laser 10 for producing a beam of monochromatic coherent light. When the apparatus is used for recording, the beam is directed through a suitable light modulator 12 which modulates the intensity of the beam in accordance with the information to be recorded. If the system is used to read out information previously recorded, the modulator 12 is, of course, omitted, and a light sensor (not shown) is arranged to collect radiation reflected from (or transmitted through) the record medium as the latter is scanned by the scanning apparatus.

Assuming for purposes of the description to follow that the apparatus is used in the recording mode, the intensity-modulated laser beam is received by a beam expander which consists of lenses 13 and 14 which operate to substantially increase the beam diameter. The expanded beam impinges on the flat disc surface 27 of an optical spinner 25 that includes a shaft 26 which is adapted for rotation by a motor or other suitable motive means (not shown) well known in the art, the rotation occuring about an axis 20 that is substantially perpendicular to surface 27. In accordance with the present invention the surface 27 has a reflective zone-type lens covering at least a portion of its surface. The zone-type lens is operative to direct the incident beam toward a focal point indicated by the reference numeral 30'. In the system as described up to this point, the rotation of spinner 25 would cause a scan of the focal point 30' through a locus of points in an arc that would typically be coincident with the position of a film on which information is being recorded. This would be in accordance with prior art teachings wherein the principal ray emerging from the holographic spinner is not normal to the scanning surface which can be pictured in FIG. 1 as the dotted line 35'. Accordingly, the problems discussed in the "Background" of this Specification would be encountered.

Figure 2:
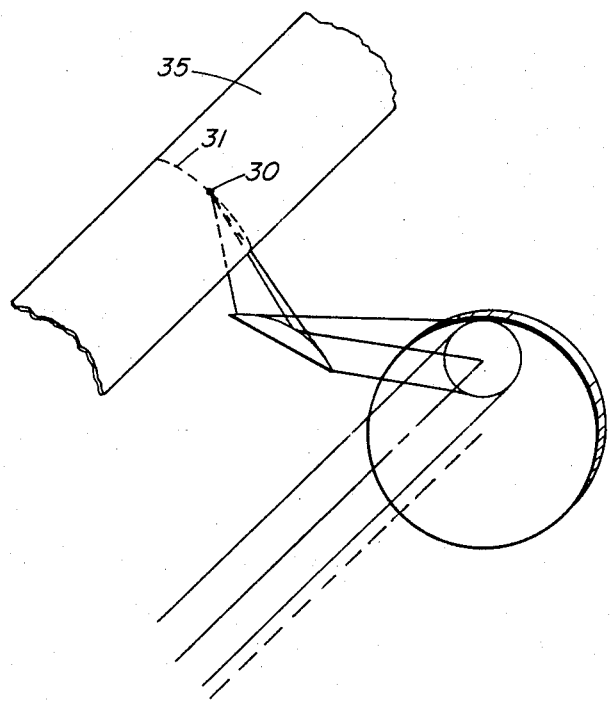
FIG. 2 illustrates another view of the embodiment of FIG. 1.

The scan of focal point 30' is typically effected by the rotation of surface 27 and results from a change of the relative position of the zone-type lens or lenses (a plurality of lenses typically being used) as the optical spinner element 25 is rotated. A zone-type lens, well known in optics, generally comprises a plate formed with a plurality of ordered curved areas or zones so that light intercepted by the plate is, by a process of interference, brought to a definite focus. In the illustration of FIG. 2, the light beam is shown as illuminating only a fraction of the total surface (for example, an area somewhat larger than a single zone-type lens), but it will be recognized that if the entire surface 27 were illuminated, each zone-type lens would generate a focused spot. As the spinner 25 is rotated, the point 30' tends to move along a circular arc, so a film 35' which is conveniently conformed to the arc by a suitable platen (not shown) is typically employed.

In accordance with the present invention, an auxiliary mirror 40 is disposed in the path of the beam and acts to redirect the beam toward a focal point designated by reference numeral 30, the focal point having a scanning locus that is represented by the dashed line 31 of FIG. 2. The mirror 40, which in the present embodiment is a convex spherical mirror, is oriented such that the principal ray of the beam is substantially perpendicular to the axis 20. In other words, the principal ray of the beam impinges normally on the film 35. In this manner, the problems generally encountered with non-normal impinging light bundles in prior art are overcome. Applicant has discovered that the proper orientation of mirror 40 is achieved when the center of the radius of curvature of mirror 40 lies on the axis 20 as is shown in FIG. 1 by the dashed line 50 and the point 51. The use of a spherical mirror, useful in the present invention because of its symmetry with respect to the beam emanating from spinner 25, would generally be considered unsuitable due to the image aberrations it introduces. In the present invention, however, a spherical mirror is employed when recording the holographic zone-type lens surface 27, so that during reconstruction the aberrations associated with the spherical surface are cancelled and the desired high resolution spot can be achieved.

Figure 3:
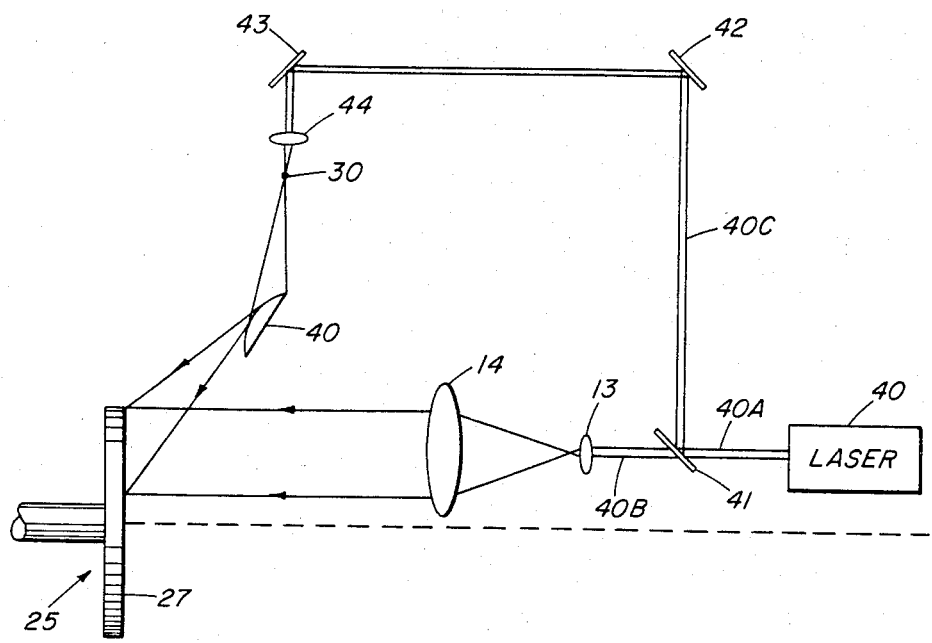
FIG. 3 illustrates the technique for making the optical spinning element of FIG. 1 in accordance with the invention.

FIG. 3 illustrates the interferometric technique by which suitable zone-type lenses may be applied to the disc surface 27. The surface of spinner 27 is first typically cleaned and a thin uniform coating of photosensitive material, such as photoresist, is applied thereon. The photoresist is then selectively exposed using the optical system shown in FIG. 3, which includes a laser beam source 40, a beam splitter 41, mirrors 42 and 43, lenses 13, 14 and 44, and spherical mirror 40. The laser beam 40A is split into a pair of beams designated as a reference beam 40B and an object beam 40C. The reference beam 40B is expanded by the beam expander comprising lenses 13 and 14, and the resultant expanded beam is directed toward surface 27. The object beam 40C is reflected from mirrors 42 and 43 and focused by the lens 44 at the point 30 which lies along the locus of focal points described with reference to reconstruction in FIGS. 1 and 2. The beam 40C diverges from the focal point 30 and is reflected off mirror 40 toward the surface 27. As a result of the two coherent beams incident on the surface 27, a holographic interference pattern is recorded in the photoresist on the surface, the pattern including whatever aberrations of the image spot 30 that might be introduced by the spherical mirror 40.

After the described exposure, whereby a single holographic zone-type lens is recorded on surface 27, the laser 40 is inactivated and the spinner is indexed to the next position where another zone-type lens is recorded in the manner described. After successive exposures of the desired number of zone-type lenses, the photoresist is developed by conventional technique and a plating layer of appropriate metal can be applied. The metal serves as a reflective surface for use in a system such as FIG. 1. Alternatively, as can be the case in a low-cost replication system, the developed surface can be utilized to make a "master" which, after bonding to a rigid fixture, can be used to transfer the appropriate pattern to duplicated spinners using a suitable pressing technique.

Figure 4:
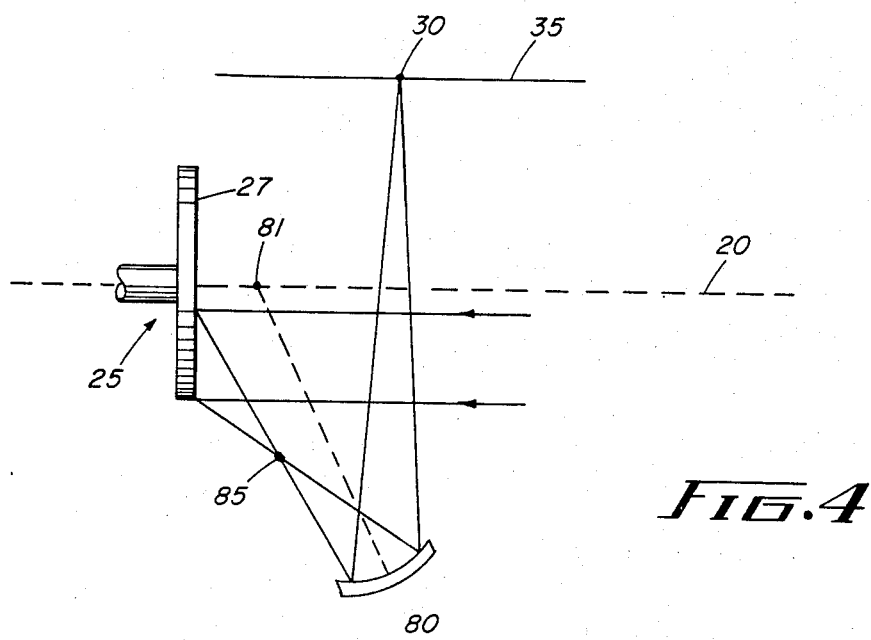
FIG. 4 illustrates another embodiment of the invention in simplified schematic form.

FIG. 4 illustrates another embodiment of the invention that is similar to the embodiment of FIG. 1, except that it employs a concave spherical mirror 80 having its center of curvature on the axis 20, as indicated by the point 81. In this embodiment, the coherent radiation is directed by a zone-type lens on surface 27 toward a focus 85 and the radiation diverging from focus 85 is redirected and converged by auxiliary mirror 80 toward a focal point 30 on a storage medium 35. Again, the spherical mirror having its center of curvature on the axis 20 is oriented such that the principal ray of the beam is substantially perpendicular to axis 20 and to the film 35. It is found, in fact, that the embodiment of FIG. 4 has the advantage of providing a longer light cone and consequently a small f-number. The zone-type lens on surface 27 of the embodiment of FIG. 4 can be fabricated in a manner similar to that shown in FIG. 3, i.e., by employing the concave spherical mirror 80 when forming the holographic surfaces.

The invention has been described with reference to particular embodiments, but it will be recognized by those skilled in the art that variations are possible within the spirit and scope of the invention. For example, it will be appreciated that the principles of the invention apply equally well to a concave holographic scanner and to transmissive or volume reflective scanners as well as reflective scanners. Also, it will be appreciated that field-flattening optics can be employed where it is desirable to scan a surface that is not curved. In fact, the design of field flattening optics will be facilitated since the principal ray is perpendicular to the surface being scanned. Further, it should be pointed out that, if desired, the auxiliary mirror of the present invention can be conveniently utilized to change the position of a reconstructed spot, for example, by providing a piezoelectric transducer to drive the auxiliary mirror. This technique can be used to null positional errors of reconstructed spots that may result from irregularities of the holographic surface or perturbations introduced by spinner rotation. Finally, the present invention also finds use in a multicolor scanning system; i.e., where multicolor laser beams are employed for recording and reconstruction.

I claim:
1. An optical scanning system, comprising:
an optical spinner having a surface rotatable about an axis that is substantially perpendicular to said surface at its point of intersection with said axis; a record medium curved about an axis parallel to said axis;
means for effecting rotation of said surface about said axis;
means for directing a source of coherent radiation toward said surface;
a zone-plate lens covering at least a portion of said surface, said lens being configured to receive said radiation and direct it at a skewed angle with respect to both said surface and said axis toward a first scanning focal point locus; and
an auxiliary reflective means disposed in the path of said directed radiation, said reflective means being shaped to redirect said radiation toward a second scanning focal point locus on said record medium such that the central ray of said radiation is in a plane substantially perpendicular to said axis.

2. An optical scanning system, comprising:
an optical spinner having a surface rotatable about an axis that is substantially perpendicular to said surface at its point of intersection with said axis;
means for effecting rotation of said surface about said axis;
means for directing a source of coherent radiation toward said surface;
a zone-plate lens covering at least a portion of said surface, said lens being configured to receive said radiation and direct it toward a first scanning focal point locus; and
an auxiliary reflective means disposed in the path of said directed radiation, said reflective means being a spherical mirror having its center of curvature on said axis and being positioned to redirect said radiation toward a second scanning focal point locus such that the central ray of said radiation is in a plane substantially perpendicular to said axis.

3. The optical scanner device as defined by claim 2 wherein said mirror has a convex surface.

4. The optical scanning device as defined by claim 2 wherein said mirror has a concave surface.

* * * * *